United States Patent [19]
Kobayashi

[11] Patent Number: 5,384,672
[45] Date of Patent: Jan. 24, 1995

[54] RECORDING OR REPRODUCING APPARATUS

[75] Inventor: Junji Kobayashi, Tokyo, Japan

[73] Assignee: Canon Kabushiki Kaisha, Tokyo, Japan

[21] Appl. No.: 848,405

[22] Filed: Mar. 6, 1992

[30] Foreign Application Priority Data

Mar. 12, 1991 [JP] Japan .................................. 3-046565

[51] Int. Cl.⁶ ............................................. G11B 15/18
[52] U.S. Cl. .................................... 360/71; 360/85
[58] Field of Search ..................................... 360/71, 85

[56] References Cited

U.S. PATENT DOCUMENTS

| | | | |
|---|---|---|---|
| 4,491,885 | 1/1985 | Morikawa et al. | 360/85 |
| 4,639,797 | 1/1987 | Kobayashi et al. | 360/85 |
| 5,153,790 | 10/1992 | Kobayashi et al. | 360/85 |

FOREIGN PATENT DOCUMENTS 0257458 10/1990 Japan .................................. 360/71

Primary Examiner—Edward K. Look
Assistant Examiner—Christopher Verdier
Attorney, Agent, or Firm—Robin, Blecker, Daley & Driscoll

[57] ABSTRACT

An apparatus is arranged to draw out a tape wound around a pair of reels accommodated in a cassette, bring the tape into abutment with a rotary drum, and record or reproduce information on or from the tape. The apparatus includes a pair of reel mounts for enabling rotational force to be transmitted to the pair of reels, respectively, a rotational driving part for transmitting a rotational driving force to either one of the pair of reel mounts, a detecting part for detecting a rotation of the reel mount to which the rotational driving force is transmitted, and a decision part for determining that the cassette is not inserted in the apparatus, if the reel mount to which the rotational driving force is transmitted is rotating at a rotational speed greater than a predetermined rotational speed.

19 Claims, 3 Drawing Sheets

RECORDING OR REPRODUCING APPARATUS

BACKGROUND OF THE INVENTION

1. Field of the Invention

The present invention relates to the detection of the insertion or noninsertion of a cassette in a recording or reproducing apparatus and, more particularly, to system control utilizing the detection of the insertion or noninsertion of a cassette, which system control is executed when dew condensation is detected in a VTR mechanism employing a slide chassis which enables relative movement between a rotary drum and a tape-shaped recording medium accommodated in the cassette.

2. Description of the Related Art

As is known to those skilled in the art, such a recording or reproducing apparatus is controlled by a method including the following major steps: detecting the presence or absence of dew condensation in the apparatus as well as the insertion or noninsertion of a cassette in the apparatus; and executing, if dew condensation is detected, the processing required to prevent a tape-shaped recording medium (hereinafter referred to as "tape") from being accidentally wound around or damaged by the rotary drum owing to the dew condensation. In general, this kind of control makes use of either one of the methods respectively shown in FIGS. 1(a) and 1(b) in flowchart form, each of which adopts a different method of detecting whether the cassette has been inserted in the apparatus. In both methods, Steps ST1 to ST3 execute the same processing. A cassette holder is moved from a position for insertion of the cassette in which the tape is accommodated to a position where the tape can be drawn out from the cassette, and the cassette holder is held at that position (ST1; the operation in Step ST1 is hereinafter called the operation of accommodating the cassette in the apparatus). When the cassette holder is held at the position, the presence or absence of dew condensation in the apparatus is detected (ST2). If the apparatus is not wet with dew condensation, loading means is actuated to cause the tape to form a predetermined path (ST3).

In the first method, the insertion or noninsertion of the cassette is detected through a detecting switch which is capable of coming into direct contact with the cassette. In the first method, as shown in FIG. 1(a), if the presence of dew condensation is detected in Step ST2, the insertion or noninsertion of the cassette is detected through the detecting switch (ST4). If no cassette has been inserted, a movable chassis is made to travel and the loading means is actuated (ST5) (The reason why Step ST5 is inserted is to minimize the size of the apparatus). If the cassette has been inserted, the loading means is not actuated and the process waits for an eject instruction (ST6). If the eject instruction is received, cassette ejection is performed (ST7).

In the second method shown in FIG. 1(b), the presence or absence of the tape is detected through a tape-end detecting sensor which is provided on a stationary chassis, and the presence or absence of the cassette is determined on the basis of the result of such detection. In this method, if the loading means is not actuated together with the movable chassis, it is impossible to perform detection of the presence or absence of the cassette. For this reason, if dew condensation is detected in Step ST2, no decision is made as to the presence or absence of the cassette, and the process waits for an eject instruction (ST11). Then, cassette ejection is performed (ST12).

The above-described first method is disadvantageous in that an exclusive detecting switch is needed. The second method has the disadvantage that the movable chassis is left projected with no cassette inserted and an exterior case of large size must be adopted if the amount of projection of the movable chassis is taken into account.

SUMMARY OF THE INVENTION

The present invention has been made to solve the above-described problems, and its first object is to provide a recording or reproducing apparatus capable of detecting the presence or absence of a cassette without the use of special detecting means.

A second object of the present invention is to provide a recording or reproducing apparatus capable of detecting immediately the presence or absence of a cassette when a cassette holder is incorporated in the apparatus.

To achieve the above objects, according to one aspect of the present invention disclosed herein, there is provided an apparatus arranged to draw out a tape wound around a pair of reels accommodated in a cassette, bring the tape into abutment with a rotary drum, and record or reproduce information on or from the tape. The apparatus comprises a pair of reel mounts for enabling rotational force to be transmitted to the pair of reels, respectively, rotational driving means for transmitting a rotational driving force to either one of the pair of reel mounts, detecting means for detecting a rotation of the aforesaid one of the reel mounts, and decision means for determining that the cassette is not inserted in the apparatus, if the reel mount to which the rotational driving force is transmitted is rotating at a rotational speed greater than a predetermined rotational speed. Accordingly, the presence or absence of the cassette can be detected by detecting the presence or absence of the rotation of the reel mount which transmits the rotational driving force to the reel of the cassette.

A third object of the present invention is to provide a recording or reproducing apparatus in which in a case where there is no inserted cassette, even if dew condensation is detected in the apparatus, a movable chassis is prevented from being left projected.

To achieve the above object, according to another aspect of the present invention, there is provided an apparatus arranged to draw out a tape wound around a pair of reels accommodated in a cassette, bring the tape into abutment with a rotary drum, and record or reproduce information on or from the tape. The apparatus comprises a first chassis for rotatably supporting the rotary drum, a second chassis relatively movable with respect to the first chassis, a pair of reel mounts for enabling rotational force to be transmitted to the pair of reels, respectively, rotational driving means for transmitting rotational driving force to either one of the pair of reel mounts, detecting means for detecting a rotation of the aforesaid one of the reel mounts, decision means for determining that the cassette is not inserted in the apparatus, if the reel mount to which the rotational driving force is transmitted is rotating at a rotational speed greater than a predetermined rotational speed, a dew-condensation detecting sensor for detecting dew condensation in the apparatus, and a control device for causing the second chassis to move in a direction in which the rotary drum and the pair of reel mounts move toward each other, when the dew-condensation detecting sensor detects dew condensation in the apparatus and the decision means detects that the cassette is not inserted in the apparatus.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENT

Figure 1B:
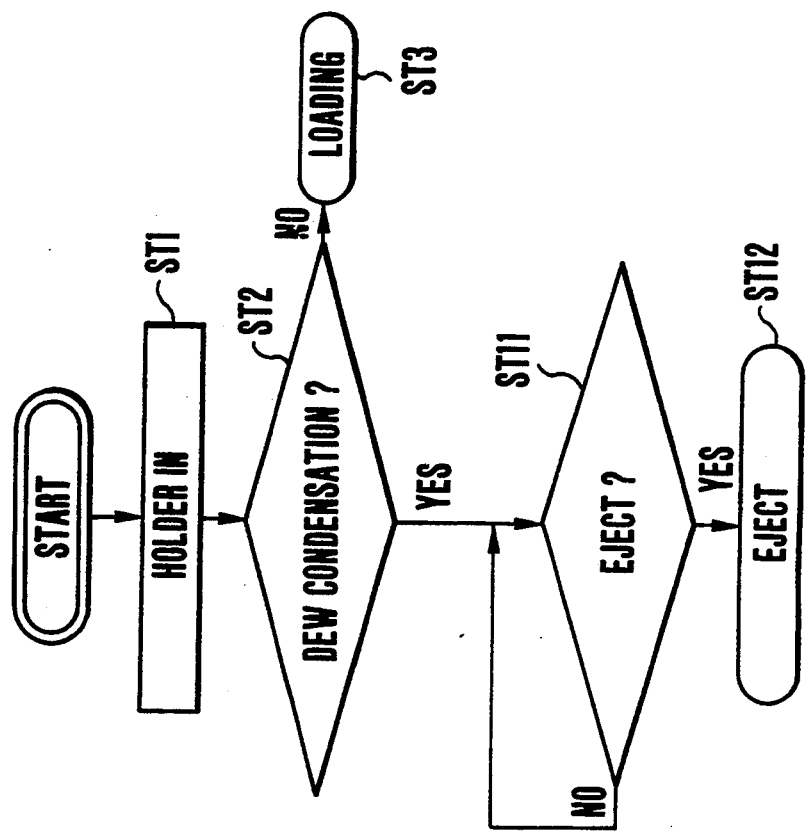
FIGS. 1 (a) and 1 (b) are flowcharts showing the related art.
Figure 1A:
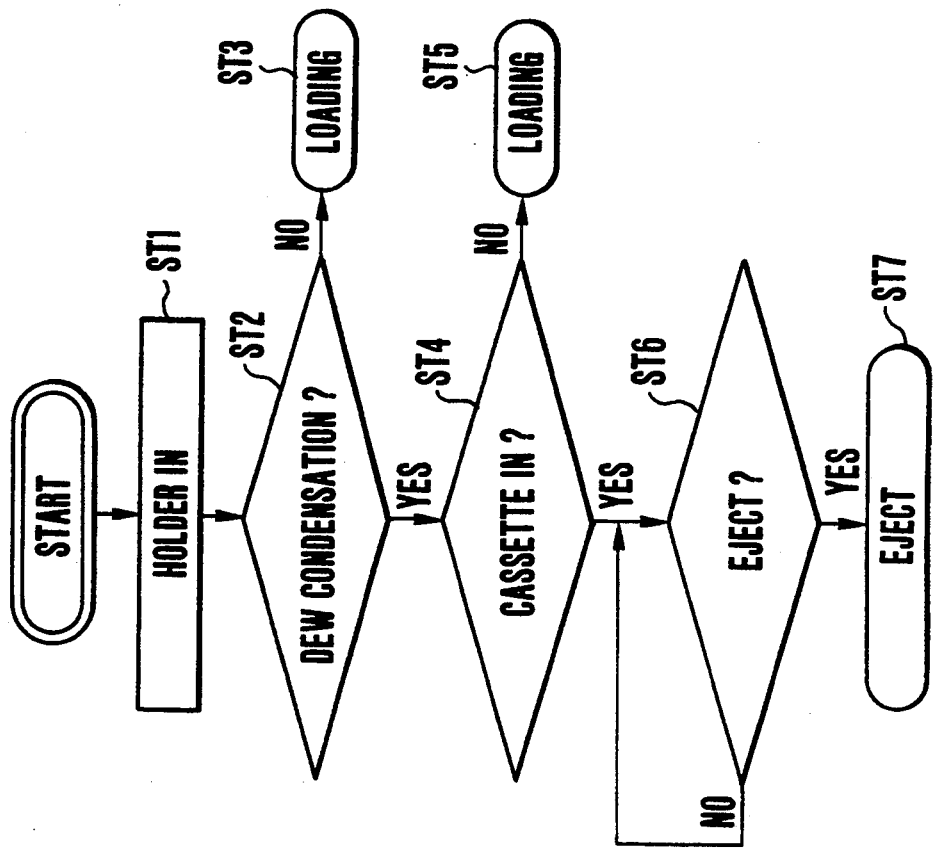
Figure 2:
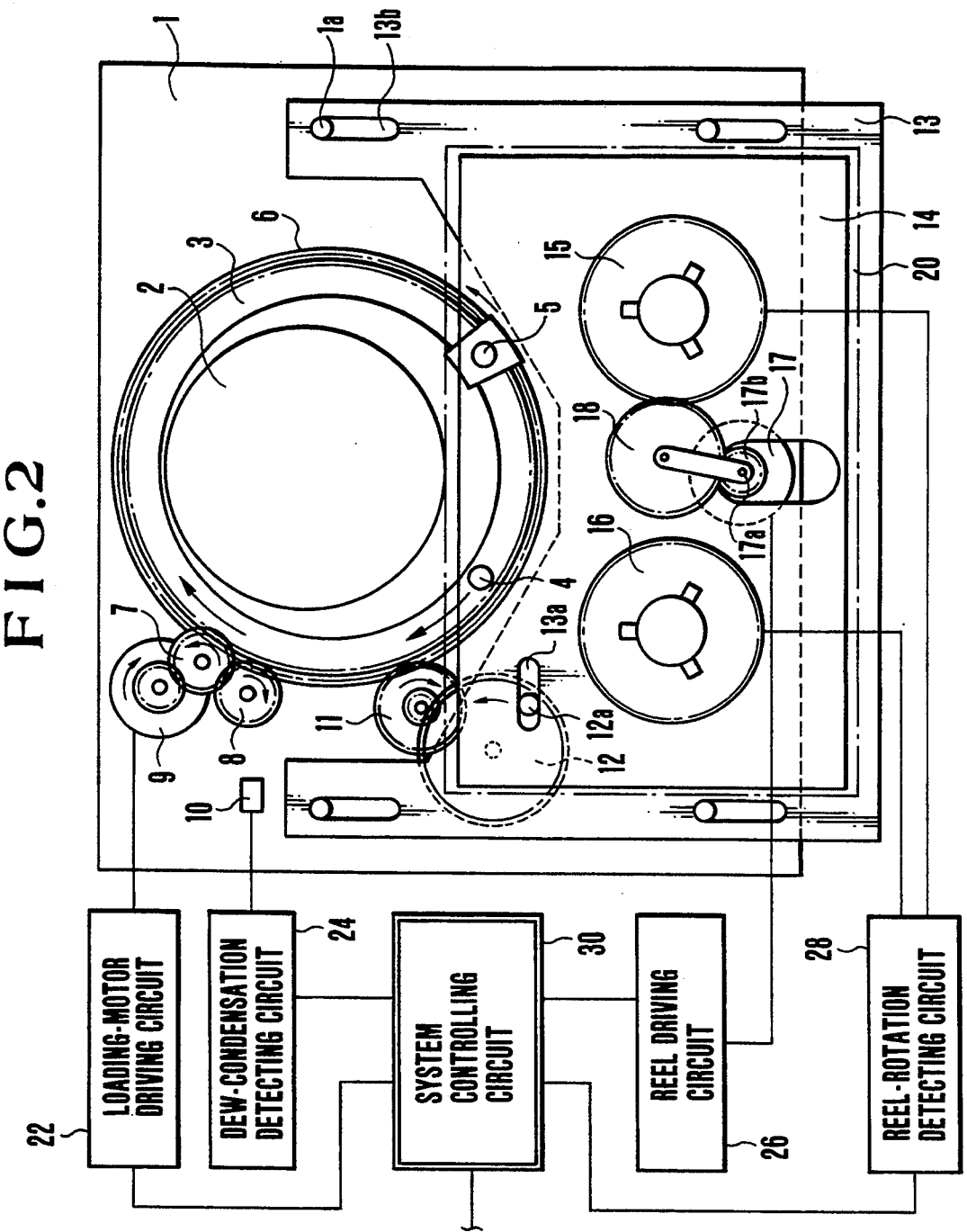
FIG. 2 is a diagrammatic, explanatory view showing a state in which a magnetic recording apparatus according to an embodiment of the present invention is placed immediately after its cassette holder has been accommodated in the apparatus.
Figure 3:
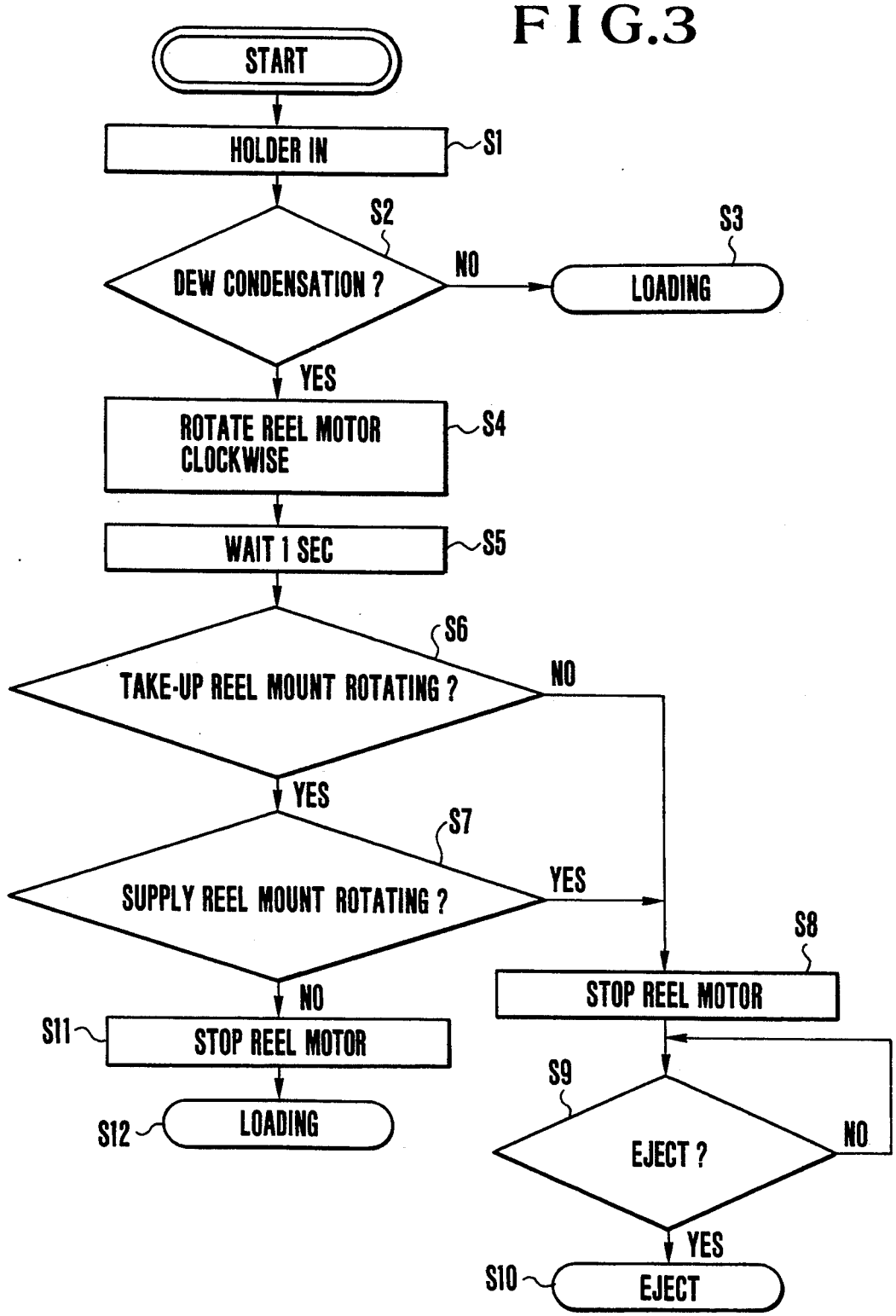
FIG. 3 is a flowchart showing the operation of the embodiment.

An embodiment of the present invention will be described below with reference to the accompanying drawings. FIG. 2 is a conceptual diagram of the arrangement of a magnetic recording apparatus (hereinafter called "apparatus") according to one embodiment of the present invention, and shows a state in which the apparatus is placed immediately after its cassette holder has been accommodated in the apparatus. FIG. 3 is a flowchart showing the operation of the embodiment.

The apparatus shown in FIG. 2 includes a stationary chassis 1, a rotary drum 2, and loading rings 3 and 6 each of which is rotatably disposed on the stationary chassis 1 with its inner periphery being secured thereto by three rotating support members (not shown). Loading posts 4 and 5 are upright disposed on the loading rings 3 and 6, respectively.

A loading motor 9 causes the loading rings 3 and 6 to rotate clockwise and counterclockwise through gears 7 and 8, respectively. With this operation, the posts 4 and 5 travel to form a predetermined tape path for bringing a tape (not shown) into abutment with the rotary drum 2.

A movable chassis 13 has slots 13b, and pins 1a which are upright disposed on the stationary chassis 1 are engaged with the respective slots 13b. Accordingly, the movable chassis 13 is arranged for sliding motion with respect to the stationary chassis 1. A slide gear 12 is made to rotate through a gear 11 with the motion of the loading ring 6. A pin 12a is upright disposed on the slide gear 12 and is engaged with a slot 13a formed in the movable chassis 13. The slot 13a is formed to extend in a direction approximately perpendicular to the direction in which the movable chassis 13 slides. As the slide gear 12 rotates, the pin 12a travels in the slot 13a to cause the movable chassis 13 to travel toward or away from the drum 2.

In the above-described arrangement, as the loading motor 9 rotates clockwise, the posts 4 and 5 effect their respective loading operations and the movable chassis 13 slides toward the drum 2.

A take-up reel mount 15 and a supply reel mount 16 have torque limiters (not shown), respectively, and are disposed on the movable chassis 13. The take-up reel mount 15 and the supply reel mount 16 engage with the respective reel hubs of the cassette 14, whereby the tape within the cassette 14 can be transported.

Clockwise rotation of a reel motor 17 causes the reel mount 15 to rotate clockwise through a gear train consisting of a gear 17b disposed on a shaft 17a of the motor 17 and a gear 18 meshed with the gear 17b, thereby making it possible to wind the tape around the take-up reel. On the other hand, if the reel motor 17 rotates counterclockwise, with the rotation of the gear 17b, the gear 18 turns about the shaft 17a of the motor 17 and engages with the reel mount 16 to cause it to rotate counterclockwise, thereby making it possible to wind the tape around the supply reel.

Magnets (not shown) are fixed to the reel mounts 15 and 16, respectively, so that the rotation of the reel mounts 15 and 16 can be detected by a Hall element (not shown) disposed on the movable chassis 13 and a reel-rotation detecting circuit 28. The output result from the reel-rotation detecting circuit 28 is transmitted to a system controlling circuit (CPU) 30. Of course, a detector other than the Hall element may also be used to perform detection of the rotation of the reel mounts 15 and 16.

A dew-condensation detecting sensor 10 is provided in the apparatus so that dew condensation in the apparatus can be detected, and the detection result obtained from the sensor 10 is transmitted to the CPU 30 via a dew-condensation detecting circuit 24.

The CPU 30 is capable of driving the loading motor 9 through a loading-motor driving circuit 22 and the reel motor 17 through a reel driving circuit 26. The CPU 30 also controls the operation of the apparatus on the basis of an input from the dew-condensation detecting circuit 24 and an input from the reel-rotation detecting circuit 28.

The operation of the embodiment will be described below with reference to FIGS. 2 and 3.

As shown in FIG. 3, the holder is accommodated in the apparatus (S1) and the presence or absence of dew condensation is detected (S2). If no dew condensation has occurred, the posts 4 and 5 are actuated so that the tape forms a predetermined path (S3). If dew condensation is detected in Step S2, the motor 17 is driven to rotate clockwise (S4), and the process waits for one second (S5). This waiting period of one second is intended to prevent the rotating operation of the reel mount 15 or 16 from being detected in error by the influence of slack in the tape during the initial period of the rotating operation. Subsequently, in the succeeding steps S6 and S7, the presence or absence of the cassette 14 is detected. More specifically, it is detected whether the take-up reel mount 15 is rotating (S6), and if the take-up reel mount 15 is rotating, it is detected whether the supply reel mount 16 is rotating (S7). The reason why the presence or absence of the cassette 14 can be detected in Steps S6 and S7 is as follows. At the time when the cassette 14 is inserted, a brake (not shown) coupled to the supply reel mount 16 is in operation, so that the take-up reel mount 15 is overloaded by the influence of the tape wound around the reels in the cassette 14 and the torque limiter operates to inhibit rotation of the reel mount 15. Therefore, if the reel mount 15 is rotating, it can be determined that the cassette 14 has not been inserted. However, even if the cassette 14 has been inserted, if the rotational torque of the take-up reel mount 15 is strong, the supply reel mount 16 as well as the take-up reel mount 15 will be made to rotate by the travel of the tape toward the take-up reel mount 15. Therefore, by detecting whether the supply reel mount 16 is rotating, it is possible to detect the presence or absence of the cassette 14. Accordingly, if it is detected that the supply reel mount 16 is rotating, this indicates that the cassette 14 has been inserted and that the tape must not be loaded. Thus, the reel motor 17 is stopped (S8) and the process waits for an eject instruction (S9). If the eject instruction is received, the cassette 14 is ejected (S10). If it is determined in Step S6 that the take-up reel mount 15 is not rotating, it is determined that the cassette 14 has been inserted, as described previously, and Steps S8, S9 and S10 are executed. If it is determined in Step S7 that the supply reel mount 16 is not rotating, it is determined that the cassette 14 has not been inserted, and the reel motor 17 is stopped (S11). In turn, the posts 4 and 5 are made to travel in the direction in which the tape is loaded, and the movable chassis 13 is made to travel toward the drum 2.

If the rotational torque of the take-up reel mount 15 is weak, Step S7 may be omitted. Step S9 may also be omitted and the cassette 14 may be ejected automatically. The detection of the rotation of the reel mount may also be performed in the following manner: If the speed of rotation exceeds a predetermined value, it is determined that the reel mount is rotating; if it is not greater than the predetermined value, it is determined that the reel mount is not rotating.

In the above-described manner, even if dew condensation is detected with the cassette holder 20 being accommodated in the apparatus, the movable chassis 13 can be prevented from remaining projected from the apparatus with no cassette 14 inserted. Accordingly, it is possible to achieve an apparatus body of minimized size.

Since the presence or absence of a cassette is detected through the detection of rotation of the reel mount, there is no need to incorporate any special cassette detecting switch.

Further, in the above-described embodiment, a far more reliable operation is achieved since braking is applied to the supply reel mount 16 during the insertion of a cassette.

In the above-described embodiment, the rotation of the take-up reel mount 15 is primarily detected to detect the presence or absence of a cassette. However, in an arrangement which utilizes a method of rewinding a tape, the rotation of the supply reel mount 16 may be primarily detected.

In the above-described embodiment, to eliminate the influence of slack in the tape, after the reel motor 17 has been rotated, a waiting period of one second is inserted in Step S5. However, the time duration of this waiting period may be arbitrarily changed for each type of apparatus to which the present invention is to be applied.

What is claimed is:

1. An apparatus arranged to draw out a tape wound around a pair of reels accommodated in a cassette, bring the tape into abutment with a rotary drum, and to effect one of recording information on the tape and reproducing the information from the tape, comprising:

(a) a pair of reel mounts for enabling rotational force to be transmitted to the pair of reels, respectively;

(b) rotational driving means for transmitting a rotational driving force to either one of the pair of reel mounts;

(c) detecting means for detecting a rotation of said reel mount to which the rotational driving force is transmitted; and (d) decision means for determining that the cassette is not inserted in said apparatus, if said reel mount to which the rotational driving force is transmitted is rotating at a rotational speed greater than a predetermined rotational speed.

2. An apparatus according to claim 1, wherein if said reel mount to which the rotational driving force is transmitted is rotating at a rotational speed not greater than the predetermined rotational speed, said decision means determines that the cassette is inserted in said apparatus.

3. An apparatus according to claim 1, wherein the rotational speed of said reel mount on the basis of which said decision means determines that the cassette is not inserted in said apparatus is a rotational speed which is reached by said reel mount when a predetermined time period elapses after the rotational driving force has been transmitted to said reel mount.

4. An apparatus according to claim 1, further comprising brake means, said brake means being arranged to act on the other reel mount to which no rotational driving force is transmitted.

5. An apparatus according to claim 2, further comprising a dew-condensation detecting sensor for detecting dew condensation in said apparatus.

6. An apparatus according to claim 5, further comprising a control device, said control device being arranged to eject the cassette when the dew-condensation detecting sensor detects dew condensation in said apparatus and said decision means detects that the cassette has been inserted in said apparatus.

7. An apparatus arranged to draw out a tape wound around a pair of reels accommodated in a cassette, bring the tape into abutment with a rotary drum, and to effect one of recording information on the tape and reproducing the information from the tape, comprising:

(a) a first chassis for rotatably supporting the rotary drum;

(b) a second chassis relatively movable with respect to said first chassis;

(c) a pair of reel mounts for enabling rotational force to be transmitted to the pair of reels, respectively;

(d) rotational driving means for transmitting rotational driving force to either one of said pair of reel mounts;

(e) detecting means for detecting a rotation of said reel mount to which the rotational driving force is transmitted;

(f) decision means for determining that the cassette is not inserted in said apparatus, if said reel mount to which the rotational driving force is transmitted is rotating at a rotational speed greater than a predetermined rotational speed;

(g) a dew-condensation detecting sensor for detecting dew condensation in said apparatus; and (h) a control device for causing said second chassis to move in a direction in which the rotary drum and said pair of reel mounts move toward each other, when said dew-condensation detecting sensor detects dew condensation in said apparatus and said decision means detects that the cassette is not inserted in said apparatus.

8. An apparatus according to claim 7, wherein said decision means determines that the cassette is inserted in said apparatus, if said reel mount to which the rotational driving force is transmitted is rotating at a rotational speed not greater than the predetermined rotational speed.

9. An apparatus according to claim 7, wherein said control device is arranged to eject the cassette when said dew-condensation detecting sensor detects dew condensation in said apparatus and said decision means detects that the cassette has been inserted in said apparatus.

10. An apparatus according to claim 7, further comprising tape loading means, said tape loading means being arranged to draw out the tape from the cassette and bring the tape into abutment with the rotary drum.

11. An apparatus according to claim 7, wherein said tape loading means travels with said second chassis.

12. An apparatus according to claim 7, wherein said reel mount to which the rotational driving force is transmitted is a take-up reel mount.

13. An apparatus arranged to draw out a tape wound around a pair of reels accommodated in a cassette, bring the tape into abutment with a rotary drum, and to effect one of recording information on the tape and reproducing the information from the tape, comprising:

(a) a first chassis for rotatably supporting the rotary drum;
(b) a second chassis relatively movable with respect to said first chassis;
(c) a cassette holder disposed on said second chassis for movement between a first position where the cassette can be inserted or ejected and a second position where the tape can be drawn out from the cassette;
(d) a pair of reel mounts disposed on said second chassis so that when said cassette holder is located in the second position, said pair of reel mounts respectively enable rotational force to be transmitted to a pair of reels in the cassette inserted in said cassette holder;
(e) rotational driving means for transmitting rotational driving force to either one of said pair of reel mounts;
(f) detecting means for detecting a rotation of said reel mount to which the rotational driving force is transmitted;
(g) decision means for determining that the cassette is not inserted in said apparatus, if said reel mount to which the rotational driving force is transmitted is rotating at a rotational speed greater than a predetermined rotational speed;
(h) a dew-condensation detecting sensor for detecting dew condensation in said apparatus; and
(i) a control device for causing said second chassis to move in a direction in which the rotary drum and said pair of reel mounts move toward each other, when said dew-condensation detecting sensor detects dew condensation in said apparatus and said decision means detects that the cassette is not inserted in said apparatus.

14. A method for detecting whether a cassette in which a tape wound around a pair of reels is accommodated is inserted in an apparatus having a pair of reel mounts for enabling rotational driving force to be respectively transmitted to the pair of reels, comprising the steps of:

(a) transmitting rotational driving force to either one of the pair of reel mounts;
(b) detecting a rotation of said reel mount to which the rotational driving force is transmitted; and
(c) determining that the cassette is not inserted if the rotational speed of said reel mount to which the rotational driving force is transmitted is greater than a predetermined value.

15. A method according to claim 14, wherein if the rotational speed of said reel mount to which the rotational driving force is transmitted is not greater than a predetermined value, it is determined that the cassette is inserted.

16. An apparatus arranged to draw out a tape wound around a pair of reels accommodated in a cassette, bring the tape into abutment with a rotary drum, and to effect one of recording information on the tape and reproducing the information from the tape, comprising:

(a) a pair of reel mounts for enabling rotational driving force to be transmitted to the pair of reels, respectively;
(b) rotational driving means for transmitting the rotational driving force to either one of said pair of reel mounts;
(c) detecting means for detecting a rotation of said reel mount to which the rotational driving force is transmitted;
(d) decision means for determining that the cassette is inserted, if said pair of reel mounts are rotating together;
wherein the rotation speed of said reel mount on the basis of which said decision means determines that the cassette is not inserted in said apparatus is a rotational speed which is reached by said reel mount when a predetermined time period elapses after the rotational driving force has been transmitted to said reel mount.

17. An apparatus according to claim 16, further comprising a dew-condensation detecting sensor for detecting dew condensation in said apparatus.

18. An apparatus according to claim 17, further comprising a control device, said control device being arranged to eject the cassette when the dew-condensation detecting sensor detects dew condensation in said apparatus and said decision means detects that the cassette has been inserted in said apparatus.

19. A method for detecting whether a cassette in which a tape wound around a pair of reels is accommodated, is inserted in an apparatus having a pair of reel mounts for enabling a rotational driving force to be respectively transmitted to the pair of reels, comprising the steps of:

(a) transmitting a rotational driving force to either one of the pair of reel mounts;
(b) detecting a rotation of said reel mount to which the rotational driving force is transmitted; and
(c) determining that the cassette is inserted if said pair of reel mounts are rotating together;
wherein the rotation speed of said reel mount on the basis of which it is determined that the cassette is not inserted in said apparatus is a rotational speed which is reached by said reel mount when a predetermined time period elapses after the rotational driving force has been transmitted to said reel mount.

* * * * *